Jan. 23, 1951   S. E. COLLINSON   2,538,830
TEMPLE FOR SPECTACLE FRAMES
Filed Nov. 25, 1949

Inventor
STANLEY E. COLLINSON
Attorney

Patented Jan. 23, 1951

2,538,830

UNITED STATES PATENT OFFICE 2,538,830

TEMPLE FOR SPECTACLE FRAMES

Stanley E. Collinson, New York, N. Y., assignor to Newport Optical Mfg. Co., Inc., Brooklyn, N. Y.

Application November 25, 1949, Serial No. 129,313

1 Claim. (Cl. 88—52)

This invention relates to spectacle frames made of a plastic such as one of the synthetic resins, for example, Plexiglass, Lucite or the cellulose nitrate sold under the trade-name "Zylonite"; and particularly the invention relates to the construction of temples used in such frames.

Plastic temples are usually reinforced by an axial wire embedded in the material, and the cross sectional shape of the temple varies in different makes from round to flat. The advantages of the flat temple, particularly when made of substantial width, are well known, and the lightness of the material makes such wide temples practicable. As compared with the round temples, they are comfortable to wear and their wider bearing area makes their hold more secure than would be the case with similarly shaped round temples.

However, the wide temples are not easily shaped to engage behind the ear and therefore they are intended to do little more than rest upon the ear and continue rearwardly, the end comprising a head-engaging pad portion which bears against the head back of the ear. This has the disadvantage of the presence of the wide strip on top of the ear which is cumbersome but without any substantial ear-engaging function.

It is the purpose of this invention to eliminate these disadvantages while retaining all the advantages of the wide temple, and to provide a construction in which the temple is shaped to conform to and engage over and behind the ear and in which the portion passing over the ear is concealed by the ear, and which is readily and easily adjustable to fit the wearer.

In accordance with the invention, this is accomplished by making the ear-engaging portion relatively narrow, having a width not greatly exceeding its thickness, this narrow portion being in the nature of a neck joining the wide portions at either end. Preferably this narrow portion is equally inset from the two edges of the temple, the shoulders being rounded so that the edges of the narrow portion merge into those of the adjacent portions. Between the shoulders the edges are parallel, thereby affording a substantial length for bending to adjust to individual wearers.

Other features and advantages of the invention will appear from the following description of the embodiment illustrated in the accompanying drawings, in which Fig. 1 is a side view of spectacles having temples embodying the invention;

The spectacle frame consists essentially of a front 1 and two temples 2 and 3. The frame is composed of a plastic, such as cellulose nitrate, suitably colored to produce the desired appearance, an example of such material being "Zylonite". The temples are hinged to the front in the usual way.

Figure 3:
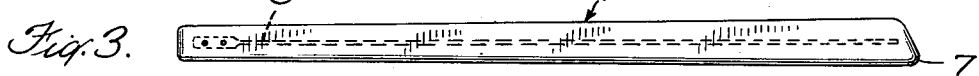
Fig. 3 is a detail in side elevation of a temple at an intermediate stage of its production.

The temples are made from strips of plastic such as shown in Fig. 3. This strip, identified by the numeral 4, is cut out from sheet stock and has two transverse holes formed near its hinge end for accommodating the rivet pins on the external ornament of the hinge assembly. The width of the strip at its hinge end is several times its thickness, and it tapers rearwardly, the width increasing progressively throughout, so that the rear end is substantially wider than the hinge end.

Figure 4:
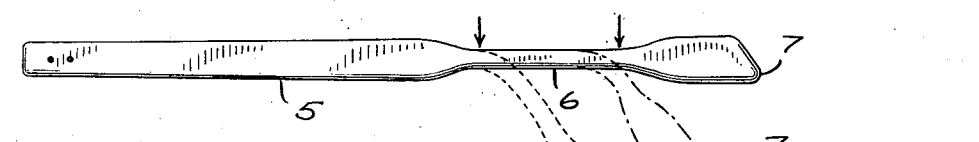
Fig. 4 is a similar view of the finished temple, indicating different possible adjustments.

Then, as shown in Fig. 4, the top and bottom edges are cut out to form longitudinal concavities or recesses on both edges throughout the section that forms the ear-engaging portion of the temple. Thus the strip is divided into three portions, namely, the side portion 5 which is the portion that bears against the temple of the wearer and extends from the hinge to the ear, the ear-engaging portion 6 and the rear, terminal head-bearing pad portion 7.

As shown, the strip is narrowed down equally on both sides to form the portion 6, and, except at the ends where the edges merge by a gradual curve into the edges of the adjacent portions, making rounded shoulders, the top and bottom edges of the portion 6 are parallel. This is, for example, the length between the two arrows in Fig. 4, and the bend to engage over the ear can be made anywhere along this length, bends at the two limits being indicated in Fig. 4 by the dash and dot line and by the dotted line positions, respectively.

Figure 1:
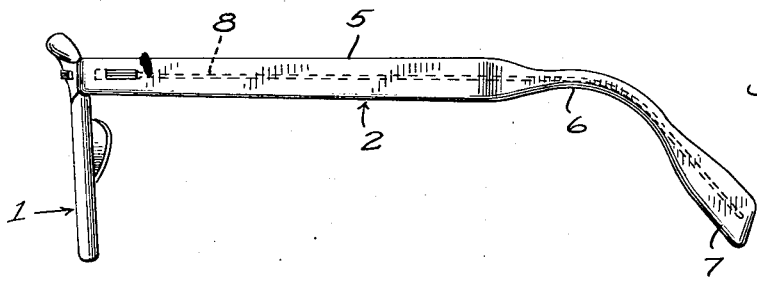
Figure 2:
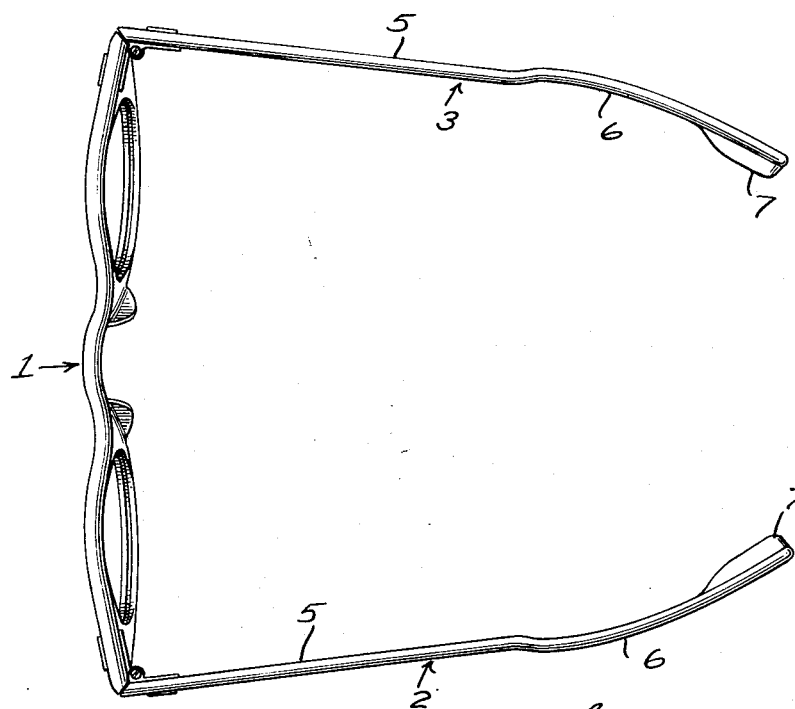
Fig. 2 is a plan of the same.

The width of the portion 6 approximates its thickness and its corners are rounded so that it is easily bent. Thus it may be bent down, as stated, at a point selected along its length to suit the requirement of the wearer, and may also be rotatively twisted and bent inwardly, as shown in Fig. 2, to bring the pad 7 into proper bearing relation for the wearer and fit to the head behind the ear. Also this construction lends itself to lateral bending of the tapered portion joining the side portion 5 with the ear-engaging portion 6, as shown in Fig. 2, so as to follow the conformation of the head and assure that the side portion at its widest part bears against the head.

It will be apparent that the concavity on the bottom edge along the portion 6 allows the side portion 5 to assume a lower position at its rear end than would otherwise be the case, and being cut away also on its upper side, the ear-engaging portion is brought down to such small compass that it is entirely concealed by the ear and is comfortable to wear. By reason of the rounded forward shoulder on the underside of portion 6, the temple fits well over the ear and is more secure on the head than is the conventional frame of this type. Also the opposing forward shoulder on the top edge causes the top edge of portion 5 to merge inconspicuously into the portion 6 which is bent to fit over the ear.

This construction has the merit of providing a pad portion 7 of the requisite width with a minimum of waste. The top and bottom edges of the pad portion are continuations of the corresponding edges of the side portion 5 and the successive tapered strips 4 are cut in reverse order from the sheet, so that virtually the only loss in material is in the trimmings and in the pieces cut out to form the ear-engaging portion.

The strip 4 may be laminated of two pieces with semi-cylindrical grooves on their inner faces which combine to form a groove for the wire 8, which wire will ordinarily be visible because of the transparency of the plastic. As shown, the wire is flattened at its front end which includes the region of the rivet holes, thus providing a reinforcement for the rivets. In this construction the two laminations are secured together through the agency of some solvent such as acetone. In another form the strip 4 is of one piece and the wire is inserted by lengthwise pressure, the plastic being heated for the purpose.

It is not necessary, although believed to be preferable, that the top and bottom recesses be equal so that the portion 6 is centrally axially disposed, and other changes in the precise construction shown in the drawings will be readily apparent to those skilled in the art within the scope of the invention as defined in the following claim.

What is claimed is:

A temple for spectacles comprising a side portion, a rear terminal head-engaging pad portion and an intermediate ear-engaging portion, the three portions being integrally formed from a flat strip of plastic material of uniform thickness throughout, the side portion having a width at its hinge end substantially greater than its thickness and increasing in width uniformly to its rear end, the pad portion having its top and bottom edges of substantial length and constituting continuations of the corresponding edges of the side portion, and the ear-engaging portion being of a width substantially equal to its thickness and having its top and bottom edges parallel and set in substantially equally from the lines of the corresponding edges of the side and pad portions and merging gradually at their ends into the said lines, whereby the ear-engaging portion is substantially square in cross section and the sides of the three portions are flat and the top and bottom edges of the side and pad portions are defined by common lines diverging uniformly from the front to rear.

STANLEY E. COLLINSON.

REFERENCES CITED

The following references are of record in the file of this patent:

UNITED STATES PATENTS

| Number | Name | Date |
|---|---|---|
| D. 129,119 | Halikman | Aug. 26, 1941 |
| 1,630,964 | Nelson | May 31, 1927 |